United States Patent [19]
Elliott et al.

[11] Patent Number: 5,353,179
[45] Date of Patent: Oct. 4, 1994

[54] AUTO-LOADING OF TAPE CARTRIDGES

[75] Inventors: Robert V. Elliott; Brian K. Hext, both of Wells, United Kingdom

[73] Assignee: M4 Data Limited, Wells

[21] Appl. No.: 986,136

[22] Filed: Dec. 4, 1992

[30] Foreign Application Priority Data

Dec. 18, 1991 [GB] United Kingdom ............... 9126792

[51] Int. Cl.⁵ ..................... G11B 15/68; G11B 17/22
[52] U.S. Cl. ....................... 360/92; 369/34; 369/36
[58] Field of Search ............ 360/92, 93, 71, 69, 360/98.06, 137; 369/39, 34, 36, 77.1; 242/180

[56] References Cited

U.S. PATENT DOCUMENTS

| 1,508,972 | 4/1978 | Black. |  |
|---|---|---|---|
| 3,938,190 | 2/1976 | Semmlow et al. | 360/92 |
| 4,063,294 | 12/1977 | Burkhart. |  |
| 4,145,724 | 3/1979 | Medding et al. |  |
| 4,314,293 | 2/1982 | Paulson | 360/92 |
| 4,614,474 | 9/1986 | Sudo | 414/281 |
| 4,644,425 | 2/1987 | Tamaki. |  |
| 4,777,547 | 10/1988 | Kikuchi et al. |  |
| 4,787,074 | 11/1988 | Deck et al. | 369/195 |
| 4,802,035 | 1/1989 | Ohtsuka | 360/92 |
| 4,932,826 | 6/1990 | Moy et al. | 360/92 |
| 5,043,962 | 8/1991 | Wanger et al. | 369/39 |

FOREIGN PATENT DOCUMENTS

| 700213 | 12/1964 | Canada | 360/92 |
|---|---|---|---|
| 55-157156 | 12/1980 | Japan | 360/92 |
| 62/07751 | 12/1987 | Japan. |  |
| 60/02051 | 5/1985 | PCT Int'l Appl. |  |
| 63/08194 | 10/1988 | PCT Int'l Appl. |  |
| 2209864A | 5/1989 | United Kingdom. |  |

Primary Examiner—Robert S. Tupper
Assistant Examiner—Allen Cao
Attorney, Agent, or Firm—Calfee, Halter & Griswold

[57] ABSTRACT

Auto-loader apparatus for tape cartridges comprises a cartridge deck having an exposed or exposable supply hub; a device that moves a cartridge along a first, preferably linear, path from an initial position in a cartridge rack and moves the cartridge along a second path which passes through the supply hub of the cartridge deck until the cartridge engages the exposed supply hub.

5 Claims, 6 Drawing Sheets

AUTO-LOADING OF TAPE CARTRIDGES

BACKGROUND OF THE INVENTION

1. Field of the invention

This invention relates to auto-loading of magnetic or optical tape cartridges or cassettes.

2. Description of the Prior Art

Figure 1A:
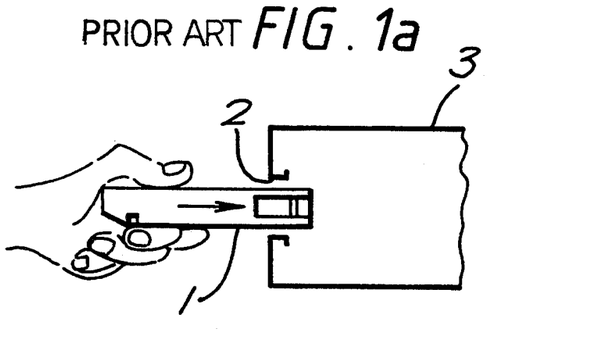
FIG. 1a shows the first stage of the process of manually loading a cartridge into a known manual load deck.
Figure 1B:
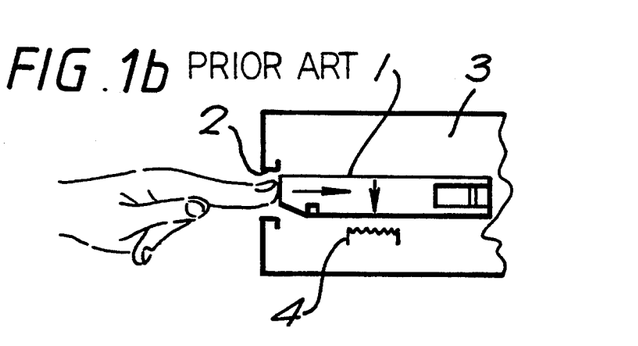
Figures 1C, 2B:
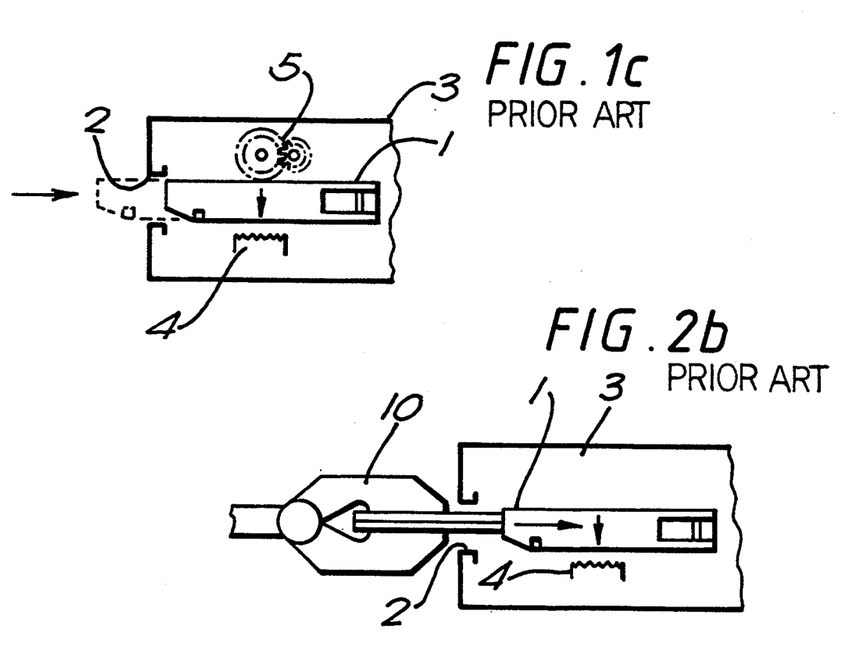

Cartridges such as 3480 style half-inch cartridges were originally designed to be used in manual load decks. These manual load decks have an enclosed supply hub for driving the tape reel, and a slot in the side of the deck through which the cartridge may be inserted. The manual loading operation is shown in FIGS. 1a, 1b and 1c of the accompanying drawings. Referring to FIG. 1a, the cartridge 1 is gripped, between the thumb on top of the cartridge and the index and second fingers underneath the cartridge, and the cartridge is pushed part-way into the slot 2 in the side of the manual load deck 3. The cartridge 1 is then either manually pushed further into the deck 3 into a position over the supply hub 4 as shown in FIG. 1b, or the cartridge 1 is gripped by a powered device 5 in the deck 3 and pulled into position over the supply hub 4 as shown in FIG. 1c. In the system of FIG. 1b, once the cartridge 1 is positioned over the supply hub 4, a spring-loaded device (not shown) is triggered to lower the cartridge down onto the teeth of the supply hub 4. In the system of FIG. 1c, the powered device 5 drives the cartridge down to engage with the supply hub 4.

Figure 2A:
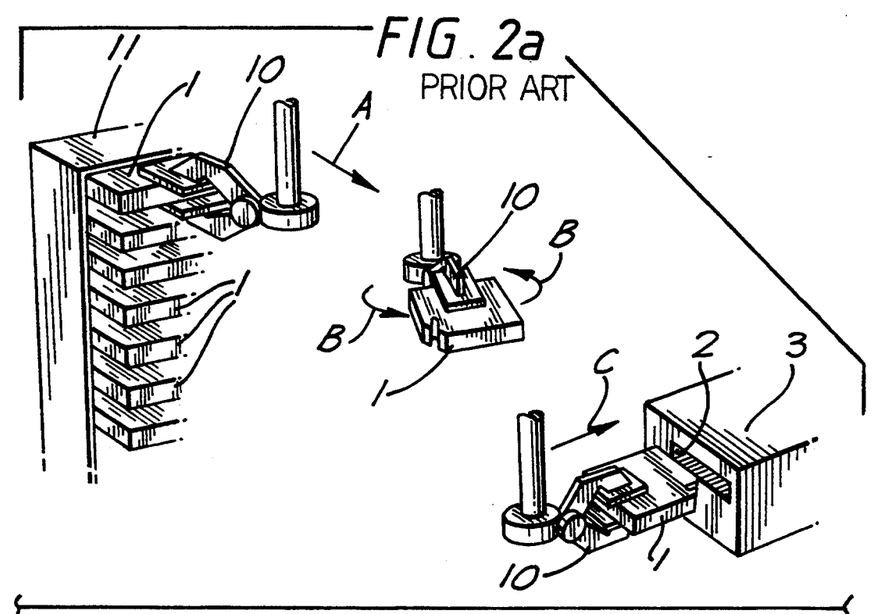
FIG. 2a is a schematic representation of existing auto-loader apparatus showing different stages in the operation thereof.

As manual load decks became established, auto-loaders were designed to load cartridges automatically into the decks. Such auto-loaders are mechanical substitute hands designed to perform the complete sequence of loading operations originally done manually. FIGS. 2a and 2b of the accompanying drawings show the operation of such an auto-loader.

FIG. 2a shows a mechanical hand 10 transporting a cartridge 1 From a magazine of rack 11 to a deck 3, illustrating three successive stages of this operation. The cartridges 1 ape stacked vertically in the rack 11 with sufficient space between each cartridge to allow insertion of the mechanical hand 10 to grip a cartridge as shown in the Figure. Once the hand 10 has gripped the cartridge 1, the First stage of the operation is movement of the hand 10 in the direction of the arrow A in FIG. 2a to remove the cartridge from the pack 11. The next stage in the operation is rotation of the hand 10 through 180° as shown by the arrows B in the figure. The hand 10 is then lowered to the level of the slot 2 and moved in the direction of the arrow C to insert the cartridge 1 partially into the slot 2 of the deck 3. If the deck mechanism is of the type shown in FIG. 1c, the powered device 5 then takes over to draw the cassette 1 into the slot and drive the cassette down onto the supply hub. If the deck system is of the type shown in FIG. 1b, the hand 10 must release the cartridge after it has been partially inserted into the slot 2, pull back away from the cartridge, close on itself and then continue to push the cartridge into the slot 2 as shown in FIG. 2b whereupon the spring-loaded device lowers the cartridge onto the teeth of the supply hub 4.

There are a number of disadvantages associated with existing auto-loader systems such as that previously described. For example, there is inefficient use of potential storage space in the rack due to the need to space the cartridges vertically sufficiently to enable access by the mechanical hand to grip a cartridge. There must also be sufficient space for the auto-loader to perform all the various separate manoeuvres of the loading procedure. In addition to inefficient use of space, the multiple operations involved in the loading process increase the complexity of the apparatus and the time taken to carry out the process.

Figure 3:
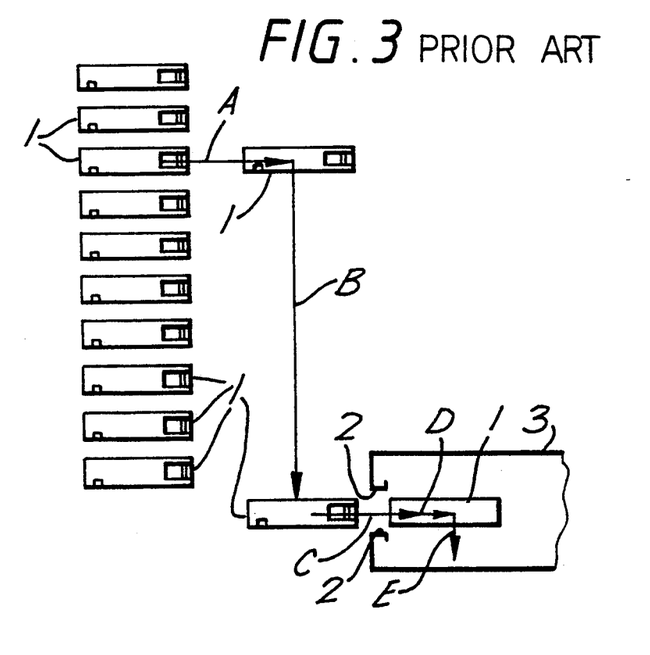
FIG. 3 shows schematically the successive stages of movement of a cartridge during a typical loading process performed by known auto-loader apparatus.

FIG. 3 of the accompanying drawings shows schematically the successive stages of movement of a cartridge 1 during a typical multi-stage loading operation performed by known auto-loader apparatus, the apparatus being omitted for clarity. The cartridge 1 is first moved out of the rack (not shown) by horizontal movement as indicated by the arrow A. The cartridge is next moved vertically downwards, as indicated by the arrow B, until level with the slot 2 of the deck 3. The cartridge 1 is then partially inserted into the deck 3 as shown by the arrow C. The cartridge is then pushed fully into the deck 3, or is drawn in by a powered device in the deck, as shown by the arrow D. Finally, the cartridge is lowered vertically into engagement with the supply hub of the deck as shown by the arrow E. Depending on the way in which the cartridge 1 is grasped by the auto-loader apparatus, and the orientation of the cartridge in the rack, rotation of the cartridge, for example through 180° as shown in FIG. 2a, may also be required. Thus, it can be seen that known loading processes require at least five stages of horizontal and vertical movement to perform the task of loading the cartridge 1 into the deck 3.

SUMMARY OF THE INVENTION

According to the present invention there is provided auto-loader apparatus for storing, moving and loading tape cartridges, the apparatus comprising: a cartridge rack that stores the tape cartridges arranged along a helix; a cartridge transfer device that (1) moves one of the tape cartridges along a first, substantially linear path from an initial position in the cartridge rack, while holding the tape cartridge in substantially the same plane as the tape cartridge is oriented in the cartridge rack, and (2) moves the tape cartridge along a second, helical path that is substantially coaxial with the helix along which the tape cartridges are arranged in the cartridge rack; and a cartridge deck having a supply hub that is arranged to receive one of the tape cartridges after movement of the tape cartridge along said second, helical path; wherein the second, helical path intersects the supply hub of the cartridge deck and the cartridge transfer device moves said tape cartridge along the helical path until the tape cartridge engages the supply hub.

The auto-loader apparatus considerably simplifies the loading operation by providing for movement of the cartridge along the second path directly onto the exposed supply hub. There is no need for the apparatus to perform the various manoeuvres required to insert the cartridge into a slot of the deck, nor for a separate mechanism in the deck to draw the cartridge into engagement with the hub, as is required in existing systems.

The deck may be such that the supply hub is permanently exposed (unless a cartridge is mounted thereon), or, for example, a movable cover may be provided such that the cover moves to expose the supply hub during loading of a cartridge. Such a cover is not, however, essential.

The complex series of movements used existing auto-loaders can thus be replaced by a simple two-stage operation, comprising movement of the cartridge along the first, substantially linear path, followed by movement of the cartridge along a helix directly into engagement with the exposed hub.

The apparatus preferably includes a cartridge rack for storing cartridges such that the cartridges are arranged along a helix which is coaxial with the second, helical path. This provides a convenient storage arrangement in which cartridges can be accessed and returned to the rack by movement along the same helical path as is used for loading cartridges onto the deck.

Movement of the cartridge along the helical path requires only a simple mechanism. For example, the said means for automatically moving the cartridge along the second path may comprise a carriage for the cartridge, the carriage being mounted for rotation about a threaded shaft to effect movement of the carriage and cartridge along the second path. With the helical path described above, the apparatus can provide particularly efficient use of operating and storage space in combination with a simple operating mechanism.

Although an automated rack may be envisaged to effect movement of the cartridge along the said first path, to allow use with a static rack it is preferred that the cartridge is removed from the rack during movement thereof along the first path. Thus, the apparatus preferably includes gripping means for gripping the cartridge to remove the cartridge from the rack during movement of the cartridge along the first path. For more efficient use of storage space than in conventional systems, it is preferred that the gripping means is arranged to grip the cartridge by contact with two opposite edges thereof. Thus, the vertical space between adjacent cartridges may be substantially reduced since the gripping means need not enter between vertically adjacent cartridges.

To reduce further the space required for operation of the auto-loader apparatus, it is preferred that the gripping means comprises a pair of conveyor belts for conveying the cartridge along the first path. Thus, movement of the cartridge out of the rack may be achieved solely by movement of the conveyor belts, and movement of the apparatus and cartridge as a whole during this stage is avoided.

The above, and other objects, features and advantages of this invention will be apparent from the following detailed description of illustrative embodiments which is to be read in conjunction with the accompanying drawings.

BRIEF DESCRIPTION OF THE DRAWINGS

FIG. 1b shows the second stage of the loading process of FIG. 1a;

FIG. 1c shows the second stage of the loading process of FIG. 1a with an alternative known manual load deck to that of FIG. 1b;

FIG. 2b shows the final stage of operation of the apparatus of FIG. 2a;

FIG. 5 is a schematic perspective view of an auto-loader apparatus incorporating the part shown in FIG. 4a;

DESCRIPTION OF THE PREFERRED EMBODIMENTS

Figure 4A:
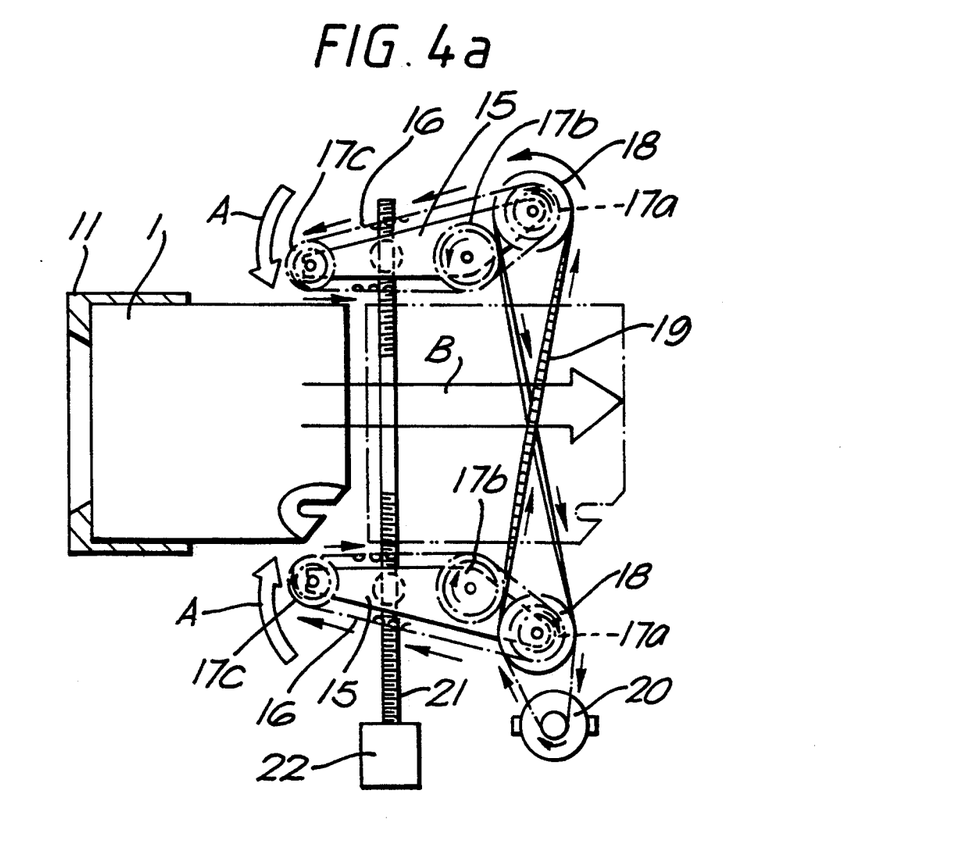
FIG. 4a is a schematic plan view of part of auto-loader apparatus embodying the invention.

Referring to FIG. 4a, apparatus embodying the invention comprises two gripping members 15 each comprising a conveyor belt 16 which runs on three pulleys 17a, 17b and 17c. Each pulley 17a is fixed to the centre shaft of a drive pulley 18. The drive pulleys 18 are interconnected by a further belt 19 and are driven by a belt motor 20. Operation of the belt motor thus causes movement of the various belts and pulleys in the directions shown by the arrows in FIG. 4a.

The gripping members 15 are interconnected by a rotable grip shaft 21 which is driven by a grip motor 22. The grip shaft 21 has right hand and left hand screw threads at respective opposite ends thereof, and each of the gripping members 15 runs on one of the screw threaded ends of the grip shaft. Rotation of the grip shaft 21 causes pivotal movement of the gripping members 15 about the pulleys 17a. Rotation of the grip shaft in one direction thus causes the gripping members 15 to close towards one another as shown by the arrows A in FIG. 4a. Rotation of the grip shaft 21 in the other direction causes the gripping members 15 to pivot away from one another.

Figure 4B:
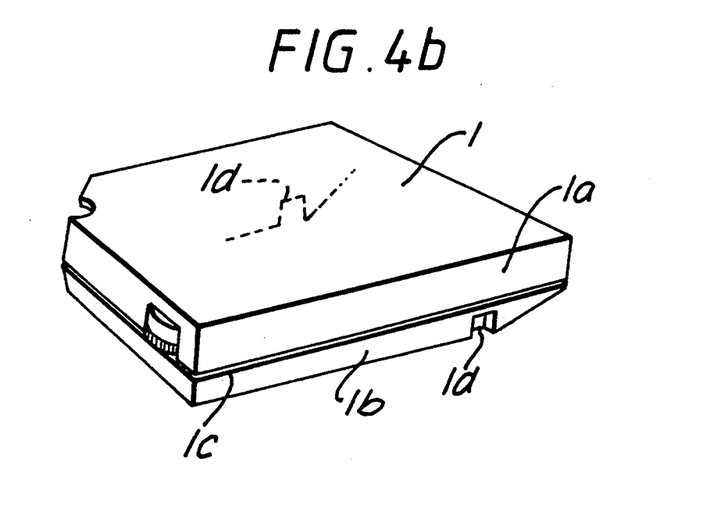
FIG. 4b is a schematic perspective view of a 3480 style half-inch tape cartridge.

FIG. 4b illustrates a 3480 style half-inch tape cartridge 1. The cartridge 1 is moulded in two parts, an upper part 1a and a lower part 1b welded together along the line 1c. A recess 1d is provided in the lower part 1b of the cartridge 1 on each of two opposite side edges of the cartridge. The recesses 1d are provided to locate and secure the cartridge in a conventional cartridge rack or cartridge deck.

Figure 5:
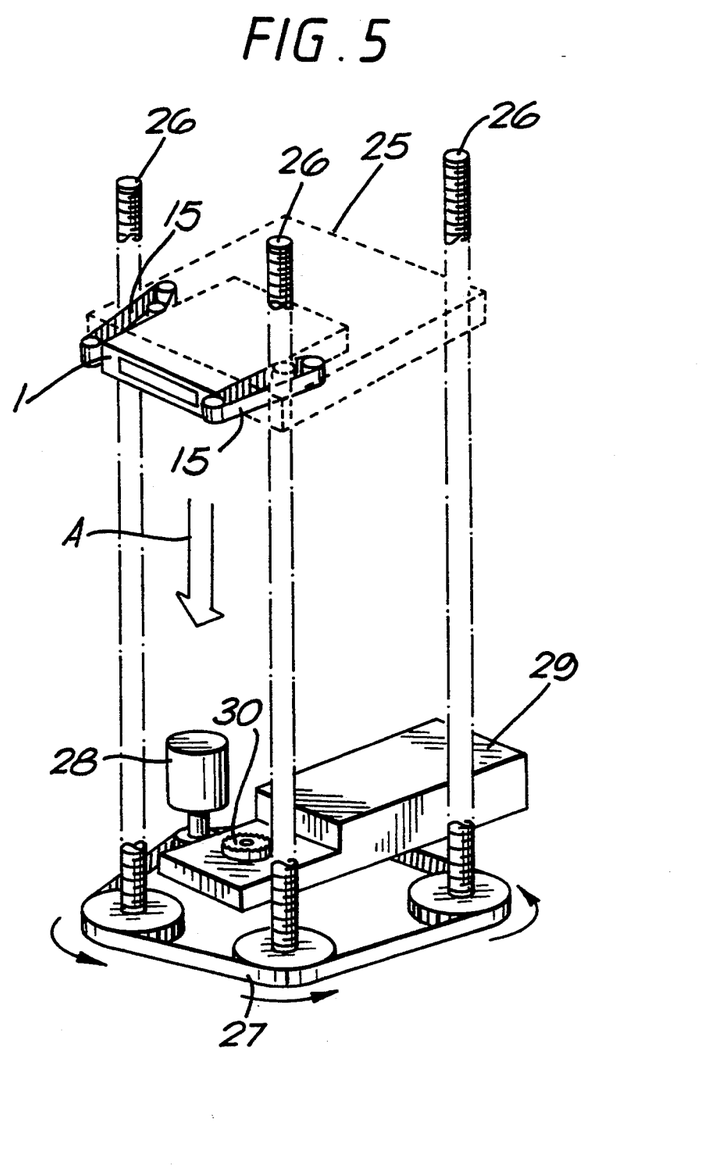

FIG. 5 is a schematic perspective view of a simple form of auto-loader apparatus, incorporating the cartridge gripping device of FIG. 4a, which will be described to assist in understanding the preferred embodiment of the invention described hereinafter with reference to FIGS. 8 and 9 of which FIG. 4 shows a part. In FIG. 5, some of the details of the apparatus shown in FIG. 4a have been omitted For clarity. The gripping members 15 and the associated drive mechanisms are mounted in a carriage for receiving a cartridge 1, the carriage being indicated schematically at 25. The carriage 25 is mounted on vertical lead screws 26 which ape interconnected at their bases by a belt 27 which is driven by a motor 28. The carriage 25 is positioned above a cartridge deck 29 which has an exposed, or uncovered, supply hub 30. When the lead screws 26 are driven in one direction by the motor 28 and belt 27, the carriage 25 moves vertically downwards on the lead screws as indicated by the arrow A in FIG. 5. The motor 28 may be a stepper motor to allow control of the vertical position of the carriage 25 on the lead screws 26 relative to a cartridge deck and the supply hub 30. Alternatively, a rotary encoder (not shown) may be provided on one of the lead screws from which the position of the lead screw shafts and hence the position of the carriage 25 can be determined.

Figure 7:
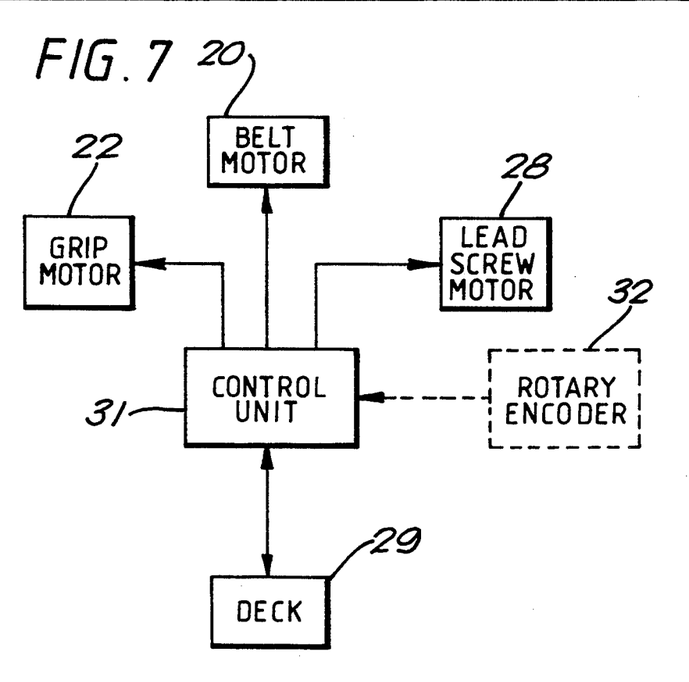
FIG. 7 is a schematic representation of the control system of the apparatus of FIG. 5.

FIG. 7 shows schematically the control system of the apparatus of FIG. 5. A control unit 31, connected to the cartridge deck 29, is also connected to the grip motor 22, belt motor 20 and the motor 28 for driving the lead screws 26, to activate and deactivate these motors at the appropriate stages of the loading operation. Where the position of the carriage 25 is determined by a rotary encoder 32, the rotary encoder provides an input to the control unit 31 to enable appropriate control of the motor 28.

The operation of the apparatus is as follows. The apparatus is positioned in use adjacent a vertical-stacking cartridge rack 11, as shown in plan view in FIG. 4a, containing a stack of 3480 style half-inch tape cartridges 1 as shown in FIG. 4b. When a cartridge is to be loaded, the motor 28 is activated by the control unit 31 to drive the lead screws 26 so that the carriage 25 moves vertically on the lead screws 26 until the gripping members 15 are aligned with the cartridge to be loaded. The grip motor 22 is then activated by the control unit 31 to drive the grip shaft 21 so that the gripping members close towards one another and grip the cartridge 1 by contact with the two opposite side edges of the cartridge in which the recesses 1d are located. Since the cartridge is gripped at the edges, the space between cartridges in the vertical direction may be substantially reduced over known arrangements. Over a number of cartridges, this amounts to a considerable saving in vertical storage space.

Once the gripping members 15 have gripped the cartridge 1, the belt motor 20 is then activated by the control unit 31 to drive the belts 16 of the gripping members 15 thereby conveying the cartridge 1 horizontally out of the rack 11 as shown by the arrow B in FIG. 4a. The cartridge 1 is drawn into the carriage 25 until the cartridge reaches an intermediate position in which the cartridge is directly above the exposed supply hub 30 of the cartridge deck 29. The belt motor 20 is then switched off by the control unit 31. The movement of the cartridge 1 during this stage of the loading operation is represented by the arrow A in the simplified schematic of FIG. 6.

Since the horizontal movement of the cartridge 1 out of the rack 11 is effected by the belts 16, there is a horizontal space saving over known auto-loader systems in which a mechanical hand must move horizontally to withdraw a cartridge from the rack.

As the cartridge 1 is drawn into the carriage 25, the belts 16 engage with the upper portion 1a of the cartridge 1 shown in FIG. 4b. When the cartridge is drawn fully into the carriage 25, spring-loaded latches (not shown) provided on the carriage 25 are received in the recesses 1d in the side edges of the cartridge 1. These latches secure the cartridge 1 in place allowing the grip motor 22 to be reactivated by the control unit 31 to open the gripping members 15 slightly to avoid obstruction by other cartridges in the rack during the subsequent movement. The spring-loaded latches may be arranged such that they engage with, and are depressed by, the lower portion 1b of the cartridge 1 as the cartridge 1 is drawn into the cartridge, and then spring into position in the recesses 1d when the cartridge is drawn fully into the carriage. Further, the latches may be shaped such that if the belt motor 20 is activated to move the cartridge out of the carriage for return to the rack 11 for example, the latches are gradually depressed as the cartridge begins to move to allow removal of the cartridge from the carriage. Of course, various other mechanisms may be provided to hold the cartridge in the carriage after removal from the rack as will be apparent to those skilled in the art.

After the gripping members 15 have been opened slightly when the cartridge 1 is aligned with the exposed supply hub 30, the control unit activates the motor 28 to drive the lead screws 26 so that the carriage 25, and hence the cartridge 1, move vertically downwards along the axis of the supply hub 30 as shown by the arrow A in FIG. 5. This vertical movement of the cartridge 1 is continued until the cartridge 1 engages with the supply hub 30. This second stage of the loading operation is indicated by the arrow B in the schematic of FIG. 6.

Figure 6:
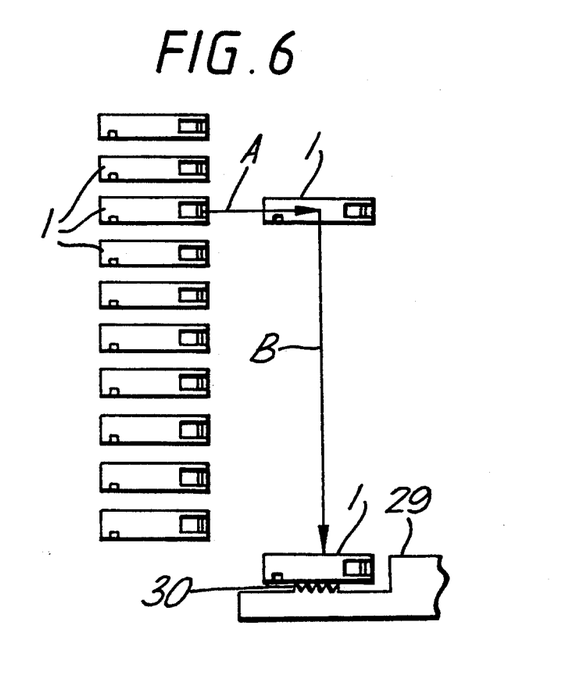
FIG. 6 shows schematically the two successive stages of movement of a cartridge during a loading operation performed by the apparatus of FIG. 5.

It can be seen from FIG. 6 that the complex series of operations and movements of known auto-loader systems may be reduced by in the apparatus of FIG. 5 to a simple two-stage process of horizontal movement of the cartridge out of the rack 11, followed directly by vertical movement of the cartridge straight into engagement with the exposed supply hub 30. The cartridge deck 29 has no slot for entry of a cartridge as a conventional deck, so that manoeuvring of the cartridge into a slot by auto-loader apparatus is avoided, and there is no need for a mechanism in the deck itself to draw the cartridge into engagement with the supply hub. Any components which, in conventional decks, overhang the supply hub are repositioned in the deck 29.

Figure 8:
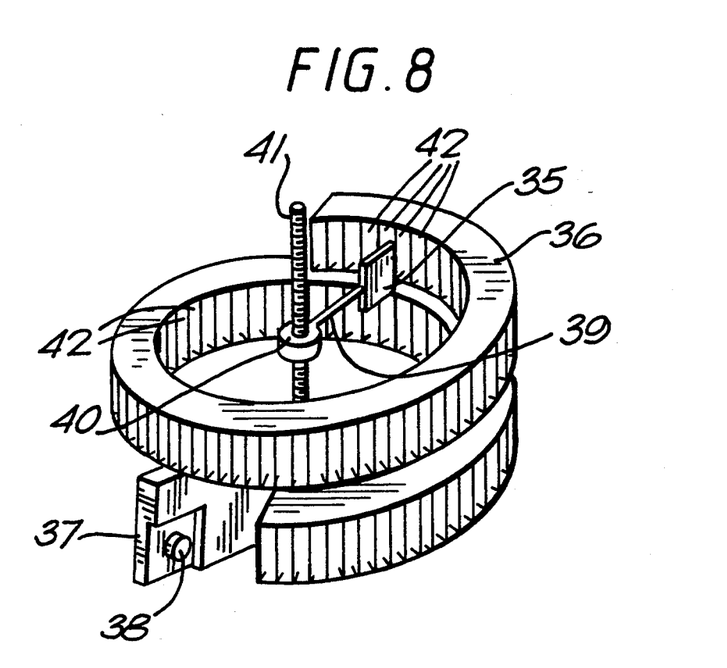
FIG. 8 is a schematic perspective view of an embodiment of auto-loader apparatus in accordance with the invention.
Figure 9:
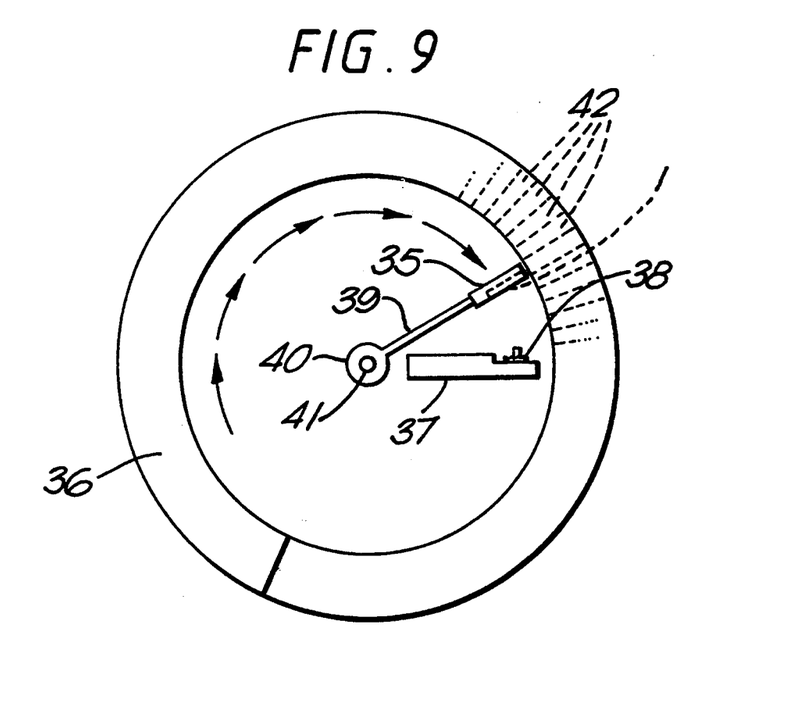
FIG. 9 is a plan view of the auto-loader apparatus of FIG. 8.

FIGS. 8 and 9 illustrate schematically a preferred embodiment of auto-loader apparatus in accordance with the invention. The apparatus comprises a carriage 35 for conveying a cartridge between a cartridge rack 36 and a cartridge deck 37 having an exposed supply hub 38. The carriage 35 is generally the same as the carriage 25 described with reference to FIG. 5, and contains the gripping members 15 (not shown in FIG. 8), the structure and operation of which has already been described with reference to FIGS. 4a and 5. In this embodiment, however, the carriage 35 is orientated to receive a cartridge in the upright position, the gripping members being arranged one above the other. The carriage 35 is connected by an arm 39 to a hub 40 which is rotatable about a vertical threaded shaft 41. The hub 40 contains a drive motor (not shown but of conventional form) for driving the hub 40 about the threaded shaft 41. When the drive motor is activated, the hub 40 rotates and moves along the thread on the shaft 41, so that the carriage 35 moves along a helical path about an axis defined by the shaft 41.

The cartridge rack 36 in the embodiment of FIG. 8 is a helical arrangement with a plurality of inwardly facing slots 42 each for storing a cartridge 1 in the upright position. The stored cartridges are thus arranged along a helix which is coaxial with the helical path followed by the carriage 35, the longitudinal axis of the helix being the threaded shaft 41. Thus, when the drive motor in the hub 40 is activated to move the carriage 35 along the helical path, the carriage 35 moves past the slots 42 containing cartridges 1, following the helix defined by the cartridge rack. The helical path described by the carriage 35 passes through the supply hub 38 of the deck 37 which is orientated as shown in FIG. 8 to receive a cartridge in the upright position.

The control system for the apparatus of FIG. 8 is similar to that shown in FIG. 7 for the apparatus of FIG. 5, except the lead screw motor 28 is replaced by the drive motor in the hub 40 for the apparatus of FIG. 8. Again, the drive motor in the hub 40 may be a stepper motor to allow the position of the carriage 35 on its helical path relative to the cartridge deck 37 to be determined. Alternatively, a rotary encoder 32 may be provided in the hub 40 from which the position of the carriage 35 relative to the deck 37 can be determined.

The operation of the apparatus of FIG. 8 is as follows. When a cartridge is to be loaded onto the deck 37, the control unit 31 is activated to drive the drive motor in the hub 40 so that the carriage follows a helical path until it is adjacent the slot 42 containing the cartridge 1 to be loaded. The grip motor 22 is then activated by the control unit 31 so that the gripping members 15 close towards one another and grip the cartridge 1 as previously described with reference to FIG. 4a. Again, since the cartridge 1 is gripped at the side edges thereof, the cartridges 1 can be packed close together in the direction of the helix defined by the cartridge rack 36. The belt motor 20 is then activated by the control unit 31 to convey the cartridge 1 into the carriage 35 where it is held as previously described by spring-loaded latches (not shown) in the carriage 35 which project into the recesses 1d in the cartridge 1. Thus, the first stage of the loading operation in this case involves a generally horizontal linear movement of the cartridge out of the rack 36 into an intermediate position in which the cartridge is clear of the rack.

When the cartridge is fully received in the carriage 35, the grip motor 22 is activated by the control unit 31 to open the gripping members 15 slightly to prevent obstruction by stored cartridges during the following stage of movement. The control unit 31 then activates the drive motor in the hub 40 causing the carriage 35 containing the cartridge 1 to follow a helical path, as indicated by the arrows in the plan view of FIG. 9, down towards the deck 37 until the cartridge 1 engages with the exposed supply hub 38. Thus, again, the complete loading operation is achieved by a simple two-stage process consisting of generally horizontal movement of the cartridge out of the rack, followed by movement of the cartridge along a helical path directly into engagement with the exposed supply hub 38. The helical system provides a convenient storage arrangement for cartridges as well as a simple loading mechanism.

Although the operation of the apparatus has been described with reference to loading of 3480 style half-inch cartridges, apparatus embodying the invention is of course suitable for use with many other types of cartridges or cassettes.

It will be seen that the auto-loader apparatus described above can provide a more efficient system than those currently known in terms of use of space, loading time, and number of manoeuvres involved in the loading process. Auto-loader apparatus embodying the invention may therefore be simpler, smaller and cheaper than known systems.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Auto-loader apparatus for storing, moving and loading tape cartridges, the apparatus comprising:
   a cartridge rack that stores the tape cartridges arranged along a helix;
   a cartridge transfer device that
      (1) moves one of the tape cartridges along a first, substantially linear path from an initial position in the cartridge rack, while holding the tape cartridge in substantially the same plane as the tape cartridge is oriented in the cartridge rack, and
      (2) moves the tape cartridge along a second, helical path that is substantially coaxial with the helix along which the tape cartridges are arranged in the cartridge rack; and
   a cartridge deck having an exposed or exposable supply hub that is arranged to receive one of the tape cartridges after movement of the tape cartridge along said second, helical path;
   wherein the second, helical path intersects the exposed or exposable supply hub of the cartridge deck and the cartridge transfer device moves said tape cartridge along the helical path until the tape cartridge engages the supply hub.

2. Apparatus as claimed in claim 1, wherein the cartridge transfer device comprises a carriage for the tape cartridge and a threaded shaft on which the carriage is mounted for movement along the second, helical path.

3. Apparatus as claimed in claim 1, wherein the cartridge transfer device includes a gripping device that grips one of the tape cartridges in the cartridge rack and holds the tape cartridge during movement of the cartridge along the first path.

4. Apparatus as claimed in claim 3, wherein the gripping device grips the tape cartridge by contact with two opposite edges of the cartridge.

5. Apparatus as claimed in claim 4, wherein the gripping device comprises a pair of conveyor belts that convey the tape cartridge along the first path.

* * * * *